UNITED STATES PATENT OFFICE.

JULIO PINAL É ICAZA, OF MEXICO, MEXICO.

METHOD OF TREATING WOOD AND PRODUCT THEREOF.

1,169,349.                    Specification of Letters Patent.        Patented Jan. 25, 1916.

No Drawing.          Application filed August 28, 1915.   Serial No. 47,836.

*To all whom it may concern:*

Be it known that I, JULIO PINAL É ICAZA, a citizen of Mexico, residing at Mexico city, Mexico, have invented certain new and useful Improvements in Methods of Treating Wood and Products Thereof, of which the following is a specification.

This invention relates to a novel method of treating wood or similar porous materials of cellulosic origin, and to the novel product thereby produced, the object of the invention being to impregnate the wood with a chemical agent which will eliminate or greatly reduce its tendency to warping, checking, or splitting; which will effectively preserve the wood against decay and the attacks of most insects; and will also render it highly resistant to fire, or even quite incombustible.

I have found that when wood is impregnated with a strong solution of magnesium chlorid it acquires the properties above mentioned. This result, so far at least as concerns the freedom from tendency to warp, split or check upon exposure to weather conditions, is attributed to the highly hygroscopic character of the magnesium chlorid, which acts to keep the wood moist even in the driest climates, and which therefore preserves it in a condition in which it is comparable, in certain respects, to live or green wood. To accomplish this result it is necessary that the quantity of magnesium chlorid absorbed by the wood should exceed a certain minimum; and this I control by impregnating the wood with magnesium chlorid solutions above a certain minimum concentration. I prefer to use solutions between 23 and 25° Bé (approximately 52 to 56% by weight of hydrated magnesium chlorid $MgCl_2 6H_2O$), but solutions of somewhat higher or lower concentration may be employed without departing from my invention. Thus as an upper limit of concentration I may use magnesium chlorid solution up to its saturation point (approximately 35° Bé.) although this is less desirable for the reason that the penetration of such solution is less rapid and certain. As a lower limit of concentration, I have observed that below 20° Bé. (corresponding approximately to 44% by weight of $MgCl_2 6H_2O$) the results are uncertain and not always satisfactory; and that when solutions of 15° Bé. (approximately 32% of hydrated magnesium chlorid) or under are used, the results which I seek are attainable only by repeated impregnations, which for most applications is prohibitively expensive. The term "strong solution of magnesium chlorid" as employed herein is to be considered as covering solutions within the limits above defined.

It is not of course essential to the invention that the magnesium chlorid solution used should be free from other dissolved salts, such as sodium chlorid or other salts ordinarily occurring therewith; but non-hygroscopic salts are not capable of replacing the magnesium chlorid for the purposes of the invention, and accordingly when they are present it should be in addition to, and not in substitution of, the magnesium chlorid. And in any case the solution should consist predominantly or essentially of magnesium chlorid; that is, the magnesium chlorid should comprise at least one-half, and preferably a considerably larger percentage, of the total dissolved matter of the solution.

The impregnation of the wood may be carried out in accordance with any of the well-known processes, including simple dipping, assisted if desired by pressure or vacuum. Preferably the wood, before the impregnation, is thoroughly seasoned, and may if desired be kiln dried. Subsequent to the impregnation the wood is usually dried sufficiently to cause the magnesium chlorid to be deposited throughout the interstices and pores of the wood, although this is not always necessary, as below explained.

For many uses, and particularly for use in dry climates, no further preparation of the wood is required. But for other purposes, and especially for use in moist climates or in moist situations, it is desirable to coat the impregnated wood with a moisture-proof, or at least moisture-resistant coating. This may consist of tar or asphalt preparations, oil-paints, oils, or other well-known coating compositions, which may be applied to the impregnated wood by dipping, brushing, spraying or equivalent methods.

A very satisfactory moisture-resistant coating may be applied by treating the wood superficially, after it has been impregnated with magnesium chlorid solution, with a solution containing sodium silicate or other soluble silicate. The effect of this treatment is to bring about the deposition of an insoluble or nearly insoluble silicate of magnesium in and on the surface of the wood. This precipitate as formed is quite gelatinous in character, and has excellent preservative as well as fireproofing qualities. When the superficial coating of insoluble silicate is to be produced, as above described, it is not essential to dry the wood after the impregnation with magnesium chlorid and before its treatment with a soluble silicate.

In cases where an external moisture-resistant coating is used, whether this consists of an insoluble silicate or of other composition, some beneficial effect may be obtained with solutions containing less magnesium chlorid than those above mentioned; so that my invention, in so far as it relates to the impregnated and coated product, is not restricted to the use of strong magnesium chlorid solutions, although even in such cases the use of such strong solutions is recommended.

It is not always necessary that the magnesium chlorid should penetrate completely the body of the wood; and a superficial penetration is within the spirit of my invention. For example, I have obtained excellent results in the case of wooden floors and the like by a superficial treatment of the wood with these strong solutions of magnesium chlorid. To a certain degree the floors are thus rendered resistant to fire, but in particular the effect is to maintain them for long periods in a slightly moist condition, with the result that the ordinary operation of sweeping is rendered nearly dustless. This effect becomes more and more pronounced under repeated treatments.

For coating purposes the magnesium chlorid solution may be mixed with coloring matters or with pigments if desired; and the treatment may be followed by a treatment with a soluble silicate as described above.

Although I have referred more particularly to the treatment of wood, the process is applicable to other porous or absorbent substances, and especially to those of cellulosic origin, to which it may be desired to impart a certain hygroscopic character, together with an increased resistance to fire.

I claim:—

1. The herein described method of treating wood or the like, which consists in impregnating the same with a strong solution consisting predominantly of magnesium chlorid, said solution having a density of at least 15° Bé.

2. The herein described method of treating wood or the like, which consists in impregnating the same with a solution consisting predominantly of magnesium chlorid, then providing the impregnated wood with an external water-resistant coating.

3. The herein described method of treating wood or the like, which consists in impregnating the same with a solution consisting predominantly of magnesium chlorid, then providing the impregnated wood with an external water-resistant coating containing magnesium silicate.

4. As a new article of manufacture, wood or the like material impregnated with a strong solution consisting predominantly of magnesium chlorid, said solution having a density of at least 15° Baumé, said article provided with an external water-resistant coating.

5. As a new article of manufacture, wood or the like material impregnated with magnesium chlorid and provided with an external water-resistant coating containing magnesium silicate.

6. As a new article of manufacture, a porous body impregnated with magnesium chlorid and coated with magnesium silicate.

In testimony whereof I affix my signature in presence of two witnesses.

JULIO PINAL É ICAZA.

Witnesses:
C. P. TOWNSEND,
J. W. HARRIS.